United States Patent
Benthien et al.

(10) Patent No.: US 9,562,352 B2
(45) Date of Patent: Feb. 7, 2017

(54) ROTARY JOINT, FRAMEWORK CONSTRUCTION KIT AND METHOD FOR CONSTRUCTING A FRAMEWORK

(71) Applicant: Airbus Operations GmbH, Hamburg (DE)

(72) Inventors: Hermann Benthien, Hamburg (DE); Ion Lucian Florea, Hamburg (DE); Jens Wilhelmi, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 0 days.

(21) Appl. No.: 14/661,286

(22) Filed: Mar. 18, 2015

(65) Prior Publication Data
US 2015/0267397 A1   Sep. 24, 2015

(30) Foreign Application Priority Data
Mar. 19, 2014   (EP) .................................. 14160733

(51) Int. Cl.
*E04B 1/41* (2006.01)
*F16C 11/04* (2006.01)
(Continued)

(52) U.S. Cl.
CPC . *E04B 1/40* (2013.01); *E04B 1/19* (2013.01); *F16C 11/04* (2013.01); *B64C 3/38* (2013.01);
(Continued)

(58) Field of Classification Search
CPC ...... E04B 1/40; E04B 1/19; E04B 2001/2406; E04B 2003/0486; E04B 2001/2421
See application file for complete search history.

(56) References Cited

U.S. PATENT DOCUMENTS

| | | | | |
|---|---|---|---|---|
| 3,006,670 A | * | 10/1961 | Schmidt | E04B 1/3211 403/55 |
| 3,912,410 A | * | 10/1975 | Pofferi | A47B 47/03 108/192 |
| 4,194,851 A | * | 3/1980 | Littlefield | E04B 1/3211 403/218 |
| 4,796,389 A | * | 1/1989 | Bini | E04B 1/1906 52/2.26 |
| 4,951,440 A | | 8/1990 | Staeger | |
| 4,998,552 A | * | 3/1991 | Niksic | E04B 1/3441 135/136 |
| 5,072,553 A | * | 12/1991 | Bozetto | E04H 5/12 261/DIG. 11 |
| 5,265,395 A | | 11/1993 | Lalvani | |
| 5,802,798 A | | 9/1998 | Martens | |
| 6,622,447 B1 | | 9/2003 | Kessler | |
| 8,651,914 B2 | | 2/2014 | Sisamos | |

(Continued)

FOREIGN PATENT DOCUMENTS

CA  2237020  6/1997
DE  2047271  6/1971
(Continued)

OTHER PUBLICATIONS

European Search Report, Aug. 27, 2014.

*Primary Examiner* — Joshua J Michener
*Assistant Examiner* — Keith Minter
(74) *Attorney, Agent, or Firm* — Greer, Burns & Crain Ltd.

(57) ABSTRACT

A rotary joint includes an outer shell segment having the outer shape of a solid of revolution, the outer shell segment having a plurality of openings arranged in the outer surface; an inner shell segment having the outer shape of the solid of revolution of the outer shell segment, the inner shell segment being aligned concentrically with the outer shell segment and spaced apart from the outer shell segment by a compensation gap; and a plurality of strut holding fixtures, the strut holding fixtures having a hollow interior and a flange portion, wherein each of the strut holding fixtures is arranged in one of the plurality of openings and the flange portion extends within the compensation gap between the inner shell segment and the outer shell segment in each case.

16 Claims, 4 Drawing Sheets

(51) Int. Cl.
*E04B 1/19* (2006.01)
*E04B 1/24* (2006.01)
*E04C 3/04* (2006.01)
*B64C 3/38* (2006.01)
*E04B 1/58* (2006.01)

(52) U.S. Cl.
CPC ............ *E04B 1/1903* (2013.01); *E04B 1/1906* (2013.01); *E04B 1/585* (2013.01); *E04B 2001/1921* (2013.01); *E04B 2001/1927* (2013.01); *E04B 2001/1942* (2013.01); *E04B 2001/1966* (2013.01); *E04B 2001/2406* (2013.01); *E04B 2001/2421* (2013.01); *E04C 2003/0486* (2013.01); *Y10T 403/32983* (2015.01)

(56) References Cited

U.S. PATENT DOCUMENTS

2009/0313938 A1* 12/2009 Li ............................ E04B 1/19
 52/656.9
2012/0227353 A1 9/2012 Xu

FOREIGN PATENT DOCUMENTS

| DE | 2232378 | 1/1974 |
| DE | 3800547 | 7/1989 |
| DE | 9310377 | 12/1993 |
| WO | 9720113 | 6/1997 |

* cited by examiner

ROTARY JOINT, FRAMEWORK CONSTRUCTION KIT AND METHOD FOR CONSTRUCTING A FRAMEWORK

CROSS-REFERENCES TO RELATED APPLICATIONS

This application claims the benefit of the European patent application No. 14160733.3 filed on Mar. 19, 2014, the entire disclosures of which are incorporated herein by way of reference.

FIELD OF THE INVENTION

The present invention relates to rotary joints, a framework construction kit employing rotary joints and a method for constructing a framework.

BACKGROUND OF THE INVENTION

Beams, joists and frames for construction work, for example in aeronautics, civil engineering or architecture, are designed to withstand bending forces acting perpendicular to the direction of extension of the respective beams. Conventional beams may be implemented as an integral part with flanges at the edges and a web spanning between the flanges. Alternatively, instead of a web, cutter milled struts may be implemented between parallel running longitudinal support bars, thus leading to decreased weight of the beam due to less material being used to form the beam.

Local load introduction into such beams or frames may, however, lead to torsional moments that are introduced into the attachment joints of the struts with the longitudinal support bars. Such torsional moments may in turn lead to additional moments within the longitudinal support bars that will have to be compensated for by local strengthening means, thereby nullifying some or all of the weight advantages gained.

Document U.S. Pat. No. 6,622,447 B1 discloses a modular structural system for building models and structures, using a plurality of connector hub members with spherical symmetry, and a plurality of strut members with longitudinal symmetry, wherein the strut members are removably engageable with the connector hub members placing the strut members in corresponding radial and tangential positions relative to the connector hub members.

Document CA 2 237 020 A1 and DE 38 00 547 A1 each disclose a set of structural elements for producing supporting structures, using supporting bars and cylindrical connecting elements for insertion heads provided on the end sides of the supporting bars.

Document U.S. Pat. No. 8,651,914 B2 discloses a set of construction components that may be assembled by connecting male and female snap-lock connectors. A female snap-lock connector includes a deflectable channel opening into a wider cavity; a male snap-lock connector includes a cylindrical head, a neck, and seat.

SUMMARY OF THE INVENTION

One idea of the invention is to provide solutions for constructing frameworks that compensate additional torsional moments coupled into the joints of the frameworks in an efficient and weight saving manner.

A first aspect of the disclosure pertains to a rotary joint comprising an outer shell segment having the outer shape of a solid of revolution, the outer shell segment having a plurality of openings arranged in the outer surface; an inner shell segment having the outer shape of the solid of revolution of the outer shell segment, the inner shell segment being aligned concentrically with the outer shell segment and spaced apart from the outer shell segment by a compensation gap; and a plurality of strut holding fixtures, the strut holding fixtures having a hollow interior and a flange portion, wherein each of the strut holding fixtures is arranged in one of the plurality of openings and the flange portion extends within the compensation gap between the inner shell segment and the outer shell segment in each case.

According to a second aspect of the disclosure, a framework construction kit comprises at least one rotary joint according to the first aspect of the disclosure, and a plurality of interconnection struts comprising engaging members at the respective end portions for insertion into the strut holding fixtures of the at least one rotary joint.

According to a third aspect of the disclosure, a framework comprises a plurality of rotary joints according to the first aspect of the disclosure, and a plurality of interconnection struts comprising engaging members at the respective end portions which are inserted into strut holding fixtures of the plurality of rotary joints.

According to a fourth aspect of the disclosure, a method for constructing a framework includes engaging a plurality of interconnection struts comprising engaging members at the respective end portions with respective strut holding fixtures of a plurality of rotary joints, each of the plurality of rotary joints comprising: an outer shell segment having the outer shape of a solid of revolution, the outer shell segment having a plurality of openings arranged in the outer surface; an inner shell segment having the outer shape of the solid of revolution of the outer shell segment, the inner shell segment being aligned concentrically with the outer shell segment and spaced apart from the outer shell segment by a compensation gap; and a plurality of strut holding fixtures, the strut holding fixtures having a hollow interior and a flange portion, wherein each of the strut holding fixtures is arranged in one of the plurality of openings and the flange portion extends within the compensation gap between the inner shell segment and the outer shell segment in each case. The method further comprises adjusting the length of the interconnection struts to form an outer profile of the framework formed by the interconnection struts and the rotary joints.

One idea on which the present invention is based is to improve the connection points of a framework made up of struts by employing rotary joints that have two concentrically nested shells of quadric shape. The nested shells are spaced apart by a gap in which sliding members may be formed. The sliding members may in each case be flange portions of holding fixtures that stick out of the outer one of the nested shells through openings or holes in the outer shell. The holding fixtures are designed to engage one end of a framework strut each, so that a lateral moment on the strut with respect to the outer surface of the nested shells will lead to a shifting movement of the sliding member along the outer surface of the inner one of the shells. Thus, any bending moment acting perpendicular to the orientation of the struts will vanish with respect to the annulus made up by the nested shells due to the movement of the sliding members on the surface of the inner shell. This means in turn that the rotary joint will be essentially free of any bending moments that would otherwise be brought into the rotary joints. The axes of the struts will always be oriented towards the center of symmetry of the rotary joint, thereby balancing out the rotary joint optimally under any loading situation on the struts.

Particularly advantageous may additionally be the reduction of costs, weight, lead time, part count and manufacturing complexity coming along with employing any kind of layer manufacturing technology when designing the components of the framework construction kit, specifically the rotary joints.

According to an embodiment of the rotary joint, the outer shape of the outer shell segment and the inner shell segment may be the shape of a cylinder, particularly a spherical cylinder, specifically for building two-dimensional frameworks.

According to a further embodiment of the rotary joint, the rotary joint may further comprise at least one end plate segment having an annular outer shape, the end plate segment being arranged at the lateral top or bottom area of the outer shell segment and the inner shell segment and providing a lateral boundary to the compensation gap.

According to a further embodiment of the rotary joint, the outer shell segment and the inner shell segment may be connected to each other in regions between two adjacent ones of the plurality of openings.

According to a further embodiment of the rotary joint, the outer shape of the outer shell segment and the inner shell segment may be the shape of a spheroid, specifically for building three-dimensional frameworks.

According to a further embodiment of the rotary joint, the openings may be arranged equidistantly over the outer surface of the outer shell segment. The number of openings may in general not be limited, but with equally spreading the openings over the surface of the joint, the flexibility of the joint when constructing various framework types is greatly enhanced.

According to a further embodiment of the rotary joint, the outer shell segment, the inner shell segment and the plurality of strut holding fixtures may be formed as an integral assembly by an additive layer manufacturing, ALM, technique.

According to a further embodiment of the rotary joint, the diameter of the strut holding fixtures may be lower than the diameter of the openings by a predefined clearance value. This clearance value may determine the amount of lateral movement that the joint is able to absorb.

According to a further embodiment of the rotary joint, the diameter of the flange portion may be greater than the diameter of the openings. This helps in mechanically securing the whole fixture within the gap between the two shell segments.

According to a further embodiment of the rotary joint, the strut holding fixtures may comprise a female snap-fit connector. Additionally, the female snap-fit connectors of the strut holding fixtures may comprise slitted side walls that are outwardly deflectable upon engagement with male snap-fit connectors. Such snap-lock mechanisms are advantageous for quick assembly and disassembly of frameworks without the need for complex tools.

According to an embodiment of the framework construction kit, the engaging members of the interconnection struts may comprise a male snap-fit connector adapted to snap-lock to the female snap-fit connector of the strut holding fixtures.

According to a further embodiment of the framework construction kit, the plurality of interconnection struts may comprise a first female-threaded strut section having a hollow cylindrical profile with a female-threaded locking nut and a second strut section having a male-threaded end portion, the male-threaded end portion being engageable into female thread of the locking nut and the female thread of the hollow cylindrical profile of the first female-threaded strut section. Such struts with variable lengths are advantageous in building flexible frameworks with irregular outer profiles.

According to a further embodiment of the framework construction kit, at least some of the plurality of interconnection struts may comprise an actuator attached to the first strut section and configured to rotate the male-threaded end portion of the second strut section to selectively adjust an overall length of the respective interconnection strut. The actuator may aid in quickly forming the outer profile of a constructed framework to a desired outer shape, such as the shape of an aircraft wing. When using actuators, the movement generating means of the actuators may be controlled automatically and in synchronicity by a central controlling unit such as a microprocessor that coordinates the adjustment of the multitude of framework struts in order to reliably and rapidly arrive at the desired structure. Furthermore, the actuators may comprise force or load sensors that are configured to determine a force or load acting upon the respective strut. Depending on the overall load distribution over adjacent struts and their respective alignment with respect to each other, the central controlling unit may dynamically control the actuators to adjust the length of the struts individually so that the load distribution among all participating struts is balanced again.

According to an embodiment of the framework, the framework may take on the shape of a frame having two substantially parallel beams formed by a first subset of the interconnection struts and diagonally staggered crossbeams between the two substantially parallel beams formed by a second subset of the interconnection struts. Such a basic structure is advantageously employed in forming a frame, stringer or crossbeam for a fuselage structure of an aircraft.

According to a further embodiment of the framework, the framework may include two beams formed by a first subset of the interconnection struts, the two beams being interconnected by means of two end rotary joints at their respective end sections, and diagonally staggered crossbeams between the two beams formed by a second subset of the interconnection struts. Such a basic structure is advantageously employed in forming the skeleton of an aerodynamically optimized streaming body, for example an aircraft wing.

According to an embodiment of the method, a first subset of the interconnection struts may each comprise a first female-threaded strut section having a hollow cylindrical profile with a female-threaded locking nut and a second strut section having a male-threaded end portion, the male-threaded end portion engaged with the hollow cylindrical profile of the first strut section and the female thread of the locking nut. Adjusting the length of the interconnection struts may in this case comprise the fraction of the male-threaded end portion that is inserted into the hollow cylindrical profile of the first strut section.

According to another embodiment of the method, at least some of the plurality of interconnection struts may comprise an actuator attached to the first strut section and configured to rotate the male-threaded end portion of the second strut section with respect to the female-threaded locking nut of the first strut section to selectively adjust an overall length of the respective interconnection strut. In this case, adjusting the length of the interconnection struts may comprise controlling the actuator to adjust the fraction of the male-threaded end portion that is inserted into the hollow cylindrical profile of the first strut section.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

DETAILED DESCRIPTION OF THE PREFERRED EMBODIMENTS

In the figures, like reference numerals denote like or functionally like components, unless indicated otherwise. Any directional terminology like "top," "bottom," "left," "right," "above," "below," "horizontal," "vertical," "back," "front," and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

Some of the components, elements and assemblies as disclosed herein may be fabricated using layer manufacturing (LM) methods which free form fabrication (FFF), direct manufacturing (DM) and additive manufacturing (AM) belong to. Those methods are used to form a three-dimensional solid object by sequentially building up layers of material. Any of such procedures will be referred to in the following description as additive layer manufacturing (ALM) or layer manufacturing (LM) without loss of generality. ALM or LM techniques usually include selectively depositing material layer by layer, selectively fusing or solidifying the material and removing excess material, if needed.

ALM or LM techniques may be used in procedures for building up three-dimensional solid objects based on digital model data. ALM/LM employs an additive process where layers of material are sequentially built up in different shapes. ALM/LM is currently used for prototyping and distributed manufacturing with multiple applications in engineering, construction, industrial design, automotive industries and aerospace industries.

Figure 1:
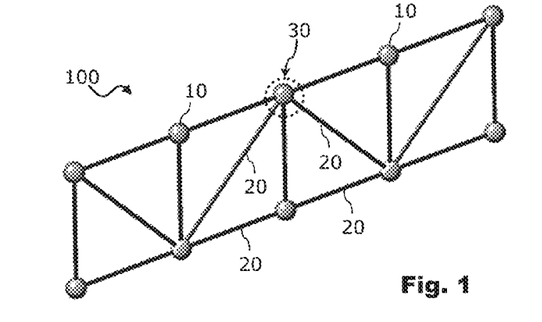
FIG. 1 schematically illustrates a framework assembly with rotary joints according to an embodiment.

FIG. 1 shows a schematic illustration of a framework 100. The framework 100 comprises a multitude of laterally and diagonally running struts 20 which may be interconnected among each other at joint regions 30. Each of the joint regions 30 may have a rotary joint 10 that is connected to each of the end portions of the struts 20 reaching into the particular joint region 30. The framework 20 may have a generally two-dimensional layout, i.e. the struts 20 and joints 10 are substantially lying in one plane of extension which may be flat or arcuate. In the exemplary case of FIG. 1 the framework 100 takes on the shape of a frame having two substantially parallel beams (running from bottom left to top right in the drawing) formed by a first subset of the interconnection struts 20 and diagonally staggered crossbeams between the two substantially parallel beams formed by a second subset of the interconnection struts 20.

The framework 20 may also have a generally three-dimensional layout, i.e. for each first plane of extension defined by a subset of struts 20, another subset of struts 20 is connected to rotary joints 10 in a manner that defines at least one further second plane of extension being arranged under a non-zero angle with respect to the first plane of extension.

The number of struts 20 being interconnected in each joint region 30 may vary and may in particular be not limited to the explicit number of two, three or five as exemplarily shown in FIG. 1. Specifically, the number of interconnecting struts 20 at each joint region 30 may take on any number greater than one. To that end, the rotary joints 10 employed at each joint region 30 may have a number of interconnection assemblies that is at least equal or greater than the number of interconnecting struts 20. Moreover, the kind, type and specific design of the rotary joints 10 may vary depending on the particular joint region 30 they are employed at.

Generally, a set of rotary joints 10 and a set of interconnecting struts 20 may form a framework construction kit which may be used to construct different frameworks of varying extension, size, shape and complexity. Thus, while it may be favorable to use as few different types of rotary joints 10 and as few different types of interconnecting struts 20 as possible to guarantee high flexibility in framework design and low implementation effort, it may as well be possible to use more different types of rotary joints 10 and/or interconnecting struts 20 in order to specifically be able to tailor the framework construction kit to the particular needs and constraints of the framework and its intended field of application.

The framework construction kits as disclosed herein may be used in many different applications, including, but not limited to, constructions of frames, stringers and crossbeams in aircraft, interior design, bridge building, vehicle carriages, civil engineering, applications for children's toys and similar.

The following FIGS. 2 to 14 exemplarily show schematic illustrations of parts and components as may be used in a framework 100 of FIG. 1. Moreover, FIGS. 15 to 19 show potential applications of the general framework structure 100 in FIG. 1 in more detail as well as descriptions of the functionally relevant portions of the parts and components as exemplarily explained in conjunction with FIGS. 2 to 14.

Figure 2:
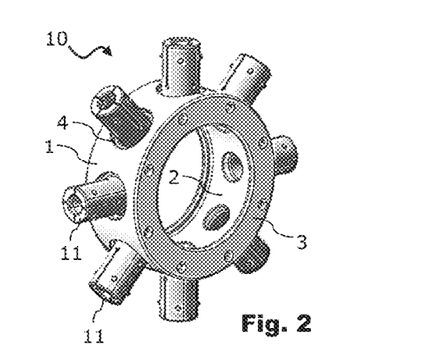
FIG. 2 schematically illustrates a perspective view of a two-dimensional rotary joint according to another embodiment.
Figure 3:
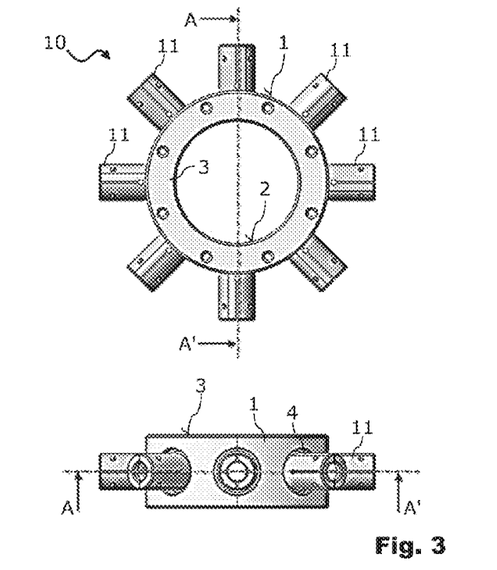
FIG. 3 schematically illustrates a front view and a top/side view of the two-dimensional rotary joint of FIG. 2.
Figure 4:
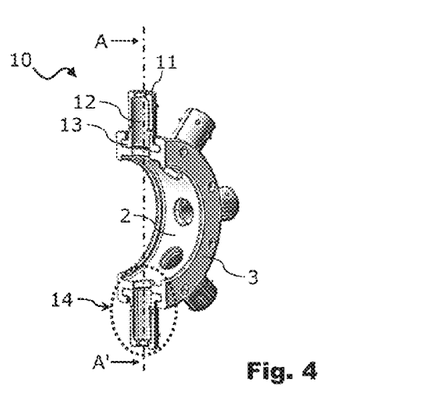
FIG. 4 schematically illustrates a cross sectional view through the two-dimensional rotary joint of FIG. 2.
Figure 5:
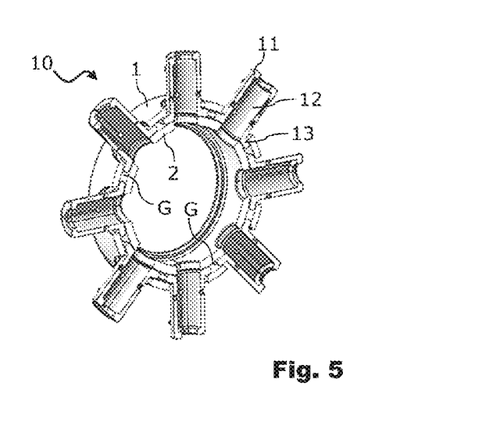
FIG. 5 schematically illustrates a further cross sectional view through the two-dimensional rotary joint of FIG. 2.

FIG. 2 shows a perspective view of a two-dimensional rotary joint 10. FIGS. 3, 4 and 5 show side views, top views and cross sectional views of the rotary joint 10 in FIG. 2 for a more detailed understanding. The lines A-A' in FIG. 3 denote the respective cut line A-A' of FIG. 4. The rotary joint 10 includes an outer shell segment 1 having the outer shape of a cylinder. The outer shell segment 1 has a plurality of openings 4 arranged in the outer surface, for example equidistantly over the outer surface of the outer shell segment 1. The openings 4 may for example be cut, milled or bored into the outer surface. If the rotary joint 10 is manufactured using a LM technique, the openings 4 may as well be included into the joint by virtue of design. The number of openings 4 is shown as eight in FIG. 2, however, any other number may be possible as well. The shape of the openings 4 may particularly be circular in the plane of the outer surface of the outer shell segment 1, however other shapes like elliptical shapes or rectangular shapes may be possible as well. It may also be possible to provide openings of different opening diameter instead of similarly sized openings 4 as exemplarily shown in FIG. 2.

The rotary joint 10 further includes an inner shell segment 2 having the outer shape of a cylinder, particularly a spherical cylinder, the inner shell segment 2 being aligned concentrically with the outer shell segment 1. The inner shell segment 2 is spaced apart from the outer shell segment 1 by a compensation gap G which can more clearly be seen in FIG. 5 which schematically illustrates a cross sectional view of the rotary joint 10 of FIG. 2. The inner shell segment 2 and the outer shell segment 1 may be connected to each other in regions between two adjacent ones of the plurality of openings 4, so that the compensation gap G is arranged substantially below the openings 4. The inner shell segment 2 may be formed integrally with the outer shell segment 1, for example by using a LM manufacturing technology.

The rotary joint 10 further comprises an end plate segment 3 having an annular outer shape. Two end plate segments 3 are arranged at the lateral top and bottom area of the outer shell segment 1 and the inner shell segment 2, respectively. The end plate segments 3 provide a lateral boundary to the compensation gap G, so that the only access to the compensation gap is through the openings 4 and, optionally, through openings in the inner surface of the inner shell segment 2. The end plate segments 3 may be bolted or screwed to the side faces of the shell segments 1, 2, however, in LM technology the end plate segments 3 may be manufactured integrally with the shell segments 1, 2 as well.

The rotary joint 10 further comprises a plurality of strut holding fixtures 11, the strut holding fixtures 11 having a hollow interior 12 and a flange portion 13. The strut holding fixtures 11 have the general shape of a top hat open to both sides, with the flange portion 13 forming the brim of the hat. The strut holding fixtures 11 may be designed to fit into the shape of the openings 4, that is, the strut holding fixtures 11 may have a cylindrical, elliptical or rectangular hollow portion, depending on the choice of shape for the openings 4. Each of the strut holding fixtures 11 is arranged in one of the plurality of openings 4, so that the flange portion 13 extends within the compensation gap G between the inner shell segment 2 and the outer shell segment 1 in each case. In FIGS. 2 to 5, the diameter of the hollow portion of the strut holding fixtures 11 is lower than the diameter of the openings 4 by a predefined clearance value, so that the outer walls of the strut holding fixtures 11 are spaced apart from the inner side walls of the openings 4 by the predefined clearance value. At the same time, the diameter of the flange portion 13 may be greater than the diameter of the openings 4, so that the flange portion 13 extends within the compensation gap G below the projection of the openings 4 onto the inner shell segment 2.

Figure 6:
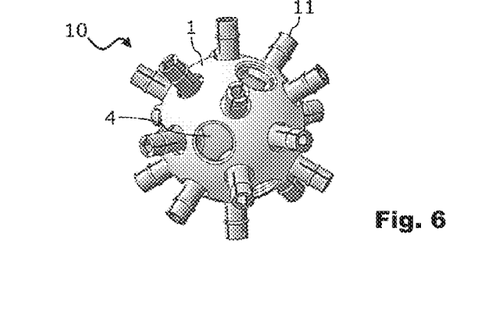
FIG. 6 schematically illustrates a three-dimensional rotary joint according to yet another embodiment.
Figure 7:
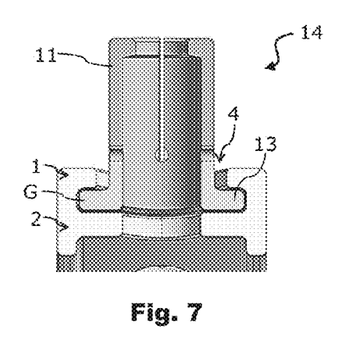
FIG. 7 schematically illustrates a detail of the rotary joints of FIGS. 2 to 6 according to a further embodiment.
Figure 8:
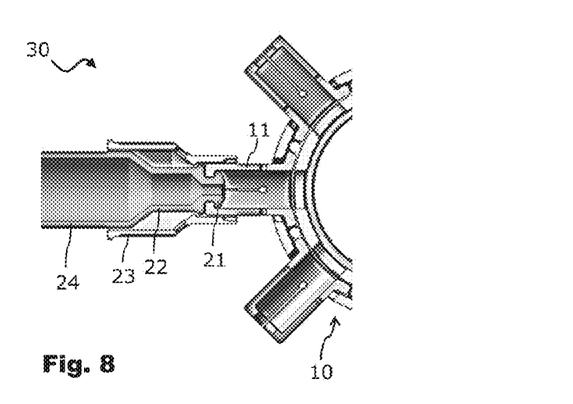
FIG. 8 schematically illustrates a detail of the rotary joints of FIGS. 2 to 6 coupled to a connecting strut according to a further embodiment.
Figure 9:
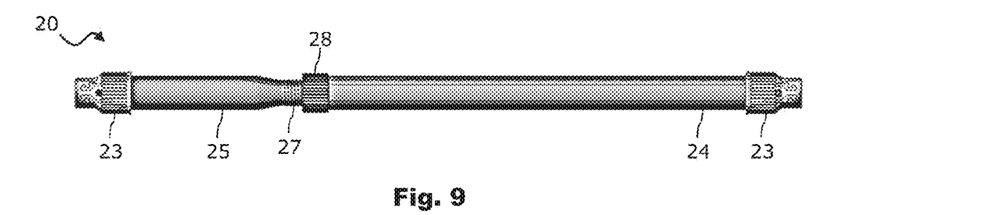
FIG. 9 schematically illustrates a front view of a connecting strut according to a further embodiment.
Figure 10:
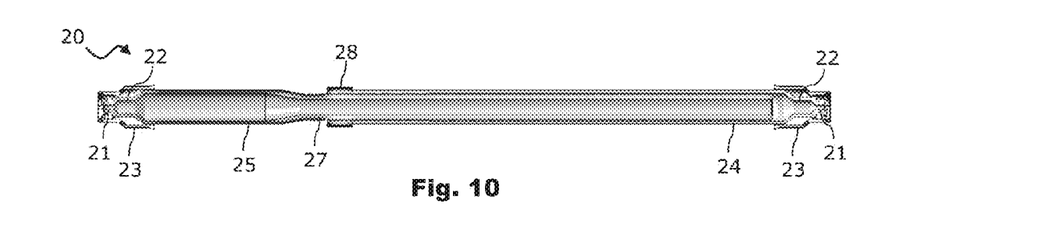
FIG. 10 schematically illustrates a cross sectional view of the connecting strut of FIG. 9.
Figure 11:
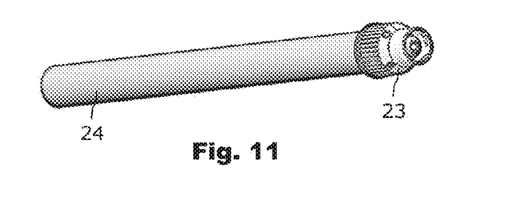
FIG. 11 schematically illustrates a perspective view of a part of the connecting strut of FIG. 9.
Figure 12:
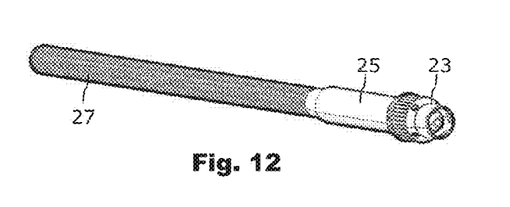
FIG. 12 schematically illustrates a perspective view of another part of the connecting strut of FIG. 9.
Figure 13:
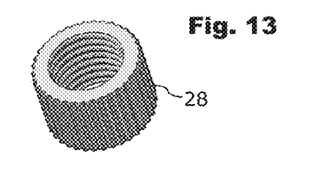
FIG. 13 schematically illustrates a perspective view of a locking/securing nut of the connecting strut of FIG. 9.

The outer shell segment 1, the inner shell segment 2 and the plurality of strut holding fixtures 11 may for example be formed as an integral assembly. Such integral assemblies may be conveniently manufactured using an additive layer manufacturing, ALM, technique. Of course, the rotary joints 10 are not limited to quasi two-dimensional joints that allow for a fixture of a strut network in a two-dimensional plain, but may be embodied as three-dimensional objects as well. FIG. 6 exemplarily shows a three-dimensional rotary joint 10 where the outer shapes of the outer shell segment 1 and the inner shell segment 2 take on the shape of a spheroid.

The strut holding fixtures 11 may be designed as part of a snap-fit or snap-lock mechanism that allows for easy, quick and releasable engagement of struts with the strut holding fixtures 11. To that end, as exemplarily shown in FIGS. 7 and 8, the strut holding fixtures 11 may comprise a female snap-fit connector, for example by forming slitted side walls in the portion of the fixtures 11 that protrude from the outer shell segment 1. These slitted side walls are outwardly deflectable upon engagement with a male snap-fit connector. The side walls of the strut holding fixtures 11 may have a snap securing flange on the far side of the rotary joint body which extends inwardly towards and over the hollow interior 12. This snap securing flange may secure a male snap-fit connector of a strut engaged with the strut holding fixtures 11 from sliding out of the hollow interior 12.

Figure 14:
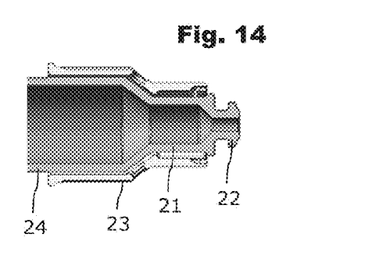
FIG. 14 schematically illustrates a cross sectional view of a detail of the connecting strut of FIG. 9.

An exemplary male snap-fit connector with engaging members 21 and 22 is shown in FIG. 14 in cross sectional view. The engaging members 21 and 22 may be staggered end portions of gradually declining diameter of an interconnection strut 20, such as the one shown in FIGS. 9 and 10. The engaging members 21, 22 are arranged at the respective end portions of each interconnection strut 20 for insertion into the strut holding fixtures 11 of the rotary joints 10. An engaging member cover 23 may slidably mounted over the engaging members 21, 22 and may be configured to slide over the respective strut holding fixtures 11 when the engaging members 21, 22 are engaged in order to stabilize and protect the snap-fit connection of the strut 20 with the rotary joint 10.

The engaging members 21, 22 of the interconnection struts 20 are designed as male snap-fit connectors adapted to snap-lock to the female snap-fit connectors of the strut holding fixtures 11. In order to provide for interconnection struts of adjustable length, the interconnection struts 20 may comprise a first female-threaded strut section 24 having a hollow cylindrical profile with a female-threaded locking nut 28. The first strut section 24 may be female-threaded over a predetermined portion of the end region opposite to the engaging members 21, 22. The first strut section 24 is exemplarily shown in FIG. 11; the female-threaded locking nut 28 in FIG. 13, respectively. The first strut section 24 is configured to take up a second strut section 25 into the hollow cylindrical profile. The second strut section 25, as exemplarily shown in FIG. 12, may have a male-threaded end portion 27, which is insertable or engageable into the hollow cylindrical profile of the first strut section 24, so that the male thread of the end portion 27 of the second strut section 25 may threadingly engage with the female thread of the first strut section 24. The male thread of the end portion 27 of the second strut section 25 may further be threadingly engaged with the female thread of the locking nut 28. Upon adjusting the position of the second strut section 25 with respect to the first female-threaded strut section 24, an overall length of the interconnection struts 20 may be selectively adjusted. This may be done by adjusting the percentage of the length of the end portion 27 of the second strut section 25 that extends into the hollow cylindrical profile of the first strut section 24. Finally, when the desired overall length of the struts 20 is adjusted, the locking nut 28 may be fastened to secure the positioning of the strut sections 24 and 25 with respect to each other. Obviously, the second strut section 25 may be equipped at its far end with a respective male snap-fit connector, that is with engaging members 21, 22 and optionally with an engaging member cover 23 as well.

Figure 15:
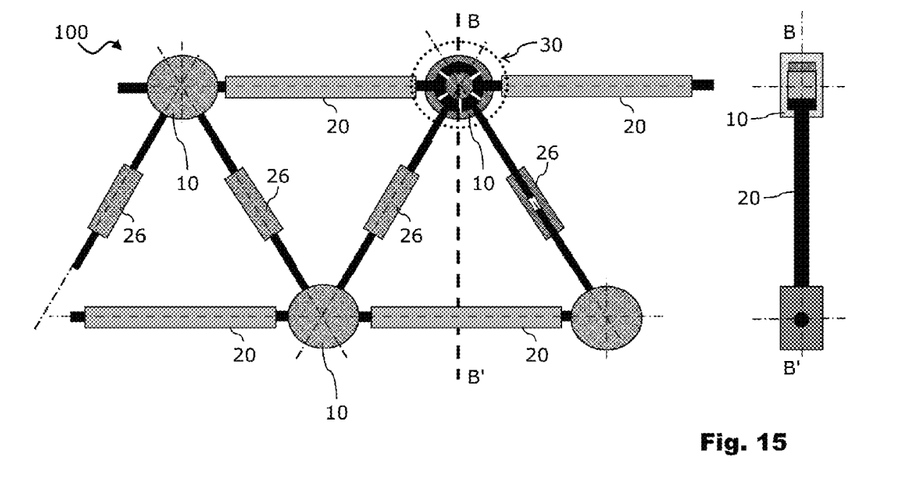
FIG. 15 schematically illustrates simplified functional front and side views of part of a framework construction according to a further embodiment.

FIG. 15 exemplarily shows a framework 100 that may be constructed using a framework construction kit employing rotary joints 10 as shown in FIGS. 2 to 8 and interconnection struts 20 as shown in FIGS. 9 to 14. The framework 100 may comprise a plurality of rotary joints 10 and a plurality of interconnection struts 20 comprising engaging members 21, 22 at the respective end portions which are inserted into strut holding fixtures 11 of the plurality of rotary joints 10. The left hand side of FIG. 15 schematically illustrates a front view of the framework 100; the right hand side of FIG. 15 a side view at the cross section line B-B'.

The framework 100 has the shape of a frame having two substantially parallel beams top and bottom formed by a first subset of the interconnection struts 20. The two substantially parallel beams top and bottom are interconnected by diagonally staggered crossbeams between the two substantially parallel beams which are formed by a second subset of the interconnection struts 20. Particularly the second subset of the interconnection struts 20 may comprise smart actuators 26 attached to the first strut section 24 which are configured to rotate the male-threaded end portion 27 of the second strut section 25 with respect to the first strut section 24. This may be done to selectively adjust an overall length of the respective interconnection strut 20. By rotating the male-threaded end portion 27, the fraction of the male-threaded end portion 27 that is located inside the hollow cylindrical profile of the first strut section 24 may be varied. When the desired fraction has been adjusted the locking nut 28 may be fastened to the male-threaded end portion 27 so that the threads of the strut sections 24 and 25 are secure with respect to each other.

Figure 17:
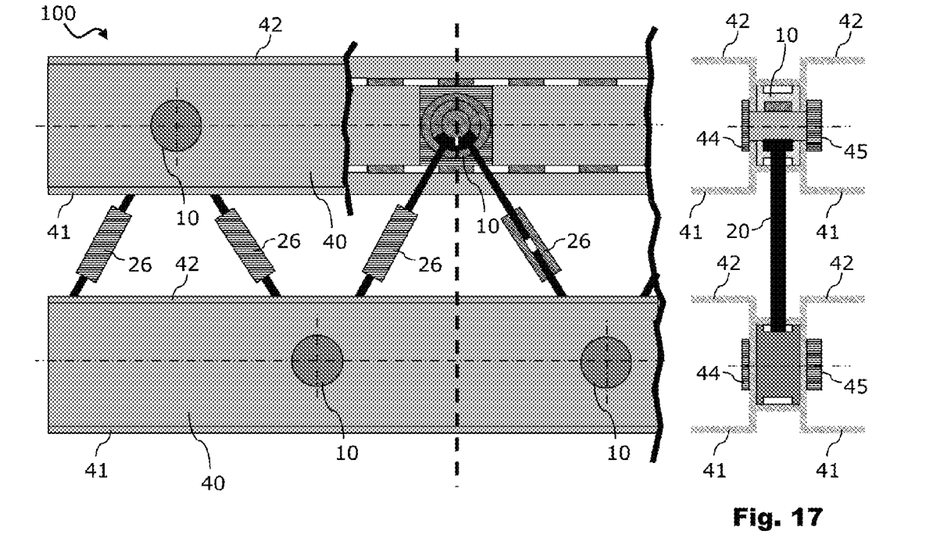
FIG. 17 schematically illustrates simplified functional front and side views of part of a framework construction according to a further embodiment.

As further shown in FIG. 17, the parallel beams of the framework 100 of FIG. 15 may also be built from beam profiles 40 that have a lower flange 41 and an upper flange 42. The beam profiles 40 may for example be extruded aluminum profiles. Again, the left hand side of FIG. 17 schematically illustrates a front view of the framework 100; the right hand side of FIG. 17 a side view at the cross section line indicated by the bold dashed line. The rotary joints 10 may be fixed in the beam profiles 40 by means of securing bolts 44 and securing nuts 45. The framework 100 with the beam profiles 40 may in particular be used for forming bending beams of load-bearing structures, such as trusses or wing boxes of aircraft.

The smart actuators 26 may comprise load or force sensing units that are able to determine the local load or force distribution over the extension of the framework 100. All actuators 26 may be controlled by a central processing unit such as a microcontroller that is able to gather all load and force measurement data of the actuators 26, determine a desired/balanced load distribution and to control individual ones of the actuators 26 to selectively adjust the length of the individual interconnection struts 20, respectively. Upon doing so, local force or load spikes may be balanced out dynamically leading to greater stability and less stress on the framework 100 and thus the beams.

Figure 16:
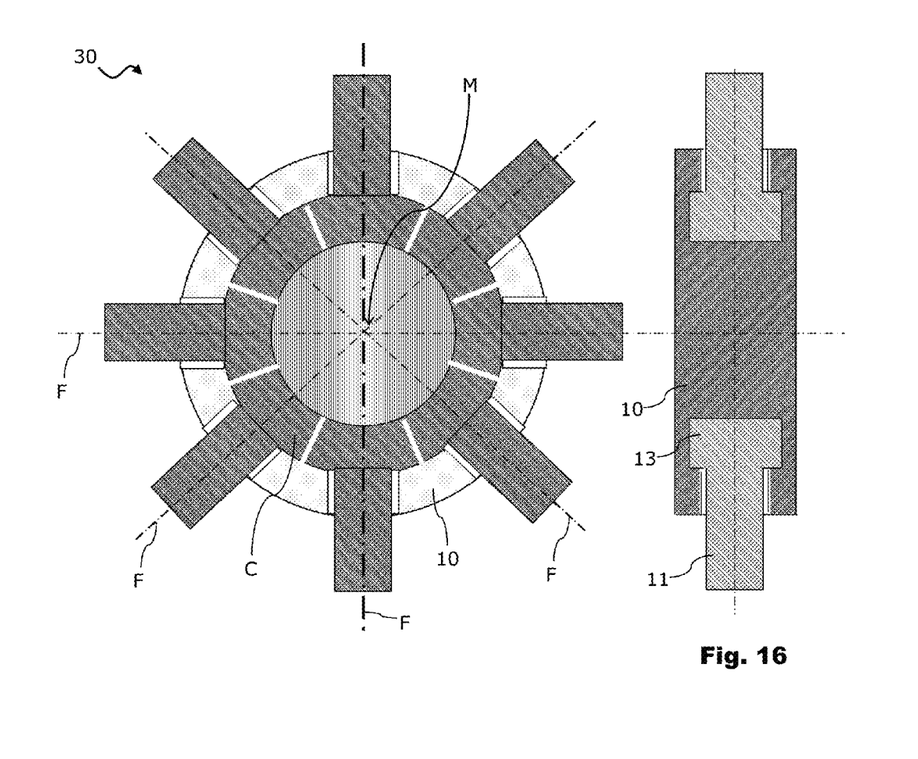
FIG. 16 schematically illustrates simplified functional view of a rotary joint used in a framework construction according to a further embodiment.

In both cases of FIGS. 15 and 17, the function of the rotary joints 10 is to divert torsional moments acting on the struts 20 lateral to their main axis into the annular shell collar as denoted by C in FIG. 16. FIG. 16 further shows schematically the force lines F that run through the main axes of the interconnection struts 20 and intersect at the force line intersection point M in the center of the rotary joint 10. Since the strut holding fixtures 11 are able to swerve or give way in the plane of the surface of the shell collar C upon being stressed with lateral moments, this swiveling motion of the interconnection struts 20 will always be able to compensate for any lateral moments acting on the struts 20. Thus, the force lines F will always intersect at the same force line intersection point M in the center of the rotary joint 10, thereby not creating any net moment on the rotary joint 10 as a whole. As a consequence, the rotary joint 10 is free from torsional stress, leading to greater mechanical stability.

Figure 18:
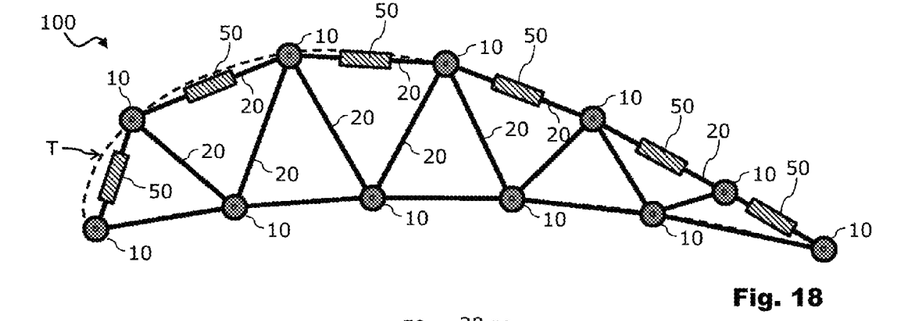
FIG. 18 schematically illustrates simplified functional front and side views of part of a framework construction according to a further embodiment.

As another variant of the framework 100, FIG. 18 shows two main beams formed by a first subset of the interconnection struts 20, the two beams being interconnected by means of two end rotary joints 10 at their respective end sections. By interconnecting the ends of the beams, the beams take on a roughly arcuate shape. When the number of struts 20 in both beams differs, or when the total length of struts 20 in both beams differs, the framework 100 may have a two-dimensional outer profile T that may for example be matched to a cross section of a wing profile. Of course, other profiles for different applications, for example in architecture, civil engineering or construction, may be approximated as well. Between the two beams, diagonally staggered crossbeams are formed by a second subset of the interconnection struts 20.

The two-dimensional outer profile T may for example be approximated by using actuators such as stepper motors 50 in the upper beam that iteratively may adjust the length of the constituting struts 20 of the upper beam to match the outer profile T as closely as possible. The actuators 50 may be similar to the actuators 26 in that they are configured to adjust the length of the interconnection struts 20 by controlling the position of the male-threaded end portion 27 with respect to the female-threaded strut section 24.

Figure 19:
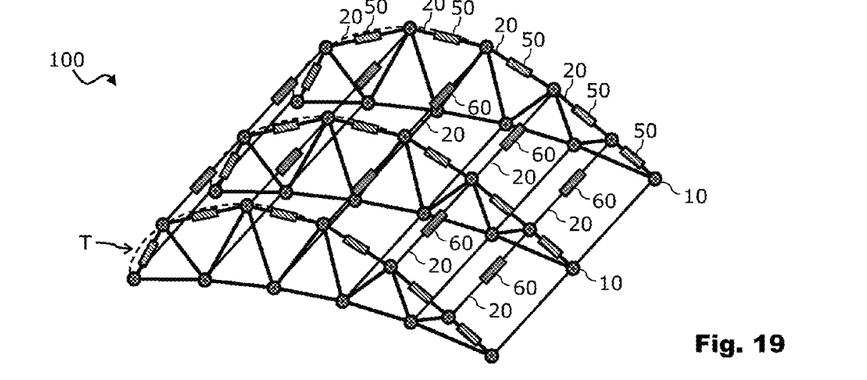
FIG. 19 schematically illustrates a simplified functional perspective view of part of a framework construction according to a further embodiment.

Multiple of the two-dimensional frameworks 100 of FIG. 18 may be combined to a three-dimensional framework 100 as exemplarily shown in FIG. 19. The "slices" of two-dimensional frameworks 100 may be interconnected by a third subset of interconnection struts 20 between corresponding rotary joints 10, which third subset of interconnection struts 20 may be equipped with actuators 60 as well. Similar to the actuators 50 of FIG. 18, the actuators 60 may be configured to adjust the length of the third subset of interconnection struts 20 by controlling the actuators 60 to adjust the position of the male-threaded end portion 27 with respect to the female-threaded strut section 24. Thereby, a complete three-dimensional out wing profile T may be approximated with a framework structure.

The difference of the variant of FIGS. 18 and 19 to the framework 100 of FIG. 17 may be that the actuators 50 and 60 may be preset to static values that approximate the wing profile T once. After that the actuators 50 and 60 do not necessarily need to be controlled any more since the lengths of the struts 20 have been adjusted optimally already. The framework 100 of FIG. 17, however, may be subject to varying stress or load conditions that require dynamically re-adjusting the actuators 26 over time depending on those varying external stress or load conditions. Thus, while the actuators 26 should be equipped with load or force sensing units, as explained in conjunction with FIG. 17, the actuators 50 and 60 do not necessarily need to be equipped with such sensing units since the amount of length control may be determined from geometric considerations alone.

A method for constructing a framework 100 comprises at first engaging a plurality of interconnection struts 20 comprising engaging members 21, 22 at the respective end portions with respective strut holding fixtures 11 of a plurality of rotary joints 10. The rotary joints 10 may have an outer shell segment 1 having the outer shape of a solid of revolution, the outer shell segment 1 having a plurality of openings 4 arranged in the outer surface, an inner shell segment 2 having the outer shape of the solid of revolution of the outer shell segment 1, the inner shell segment 2 being aligned concentrically with the outer shell segment 1 and spaced apart from the outer shell segment 1 by a compensation gap G, and a plurality of strut holding fixtures 11, the strut holding fixtures 11 having a hollow interior 12 and a flange portion 13, as explained and shown in great detail with respect to FIGS. 2 to 6. Each of the strut holding fixtures 11 is arranged in one of the plurality of openings 4 and the flange portion 13 extends within the compensation gap G between the inner shell segment 2 and the outer shell segment 1 in each case. The method then comprises adjusting the length of the interconnection struts 20 to form an outer profile of the framework 100 formed by the interconnection struts 20 and the rotary joints 10.

The framework construction kit as described as explained above is a cheap, extremely light and flexible system that allows for rapid construction and deconstruction of multiple structures of varying outer profile. The framework construction kit may for example be used to build bending beams that are essentially free from torsional moments in the interconnection joints. It allows for tolerance compensation and adjustment to flexible surfaces such as aircraft flaps or wings.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A rotary joint, comprising:
an outer shell segment having the outer shape of a solid of revolution, the outer shell segment having a plurality of openings arranged in the outer surface;
an inner shell segment having the outer shape of the solid of revolution of the outer shell segment, the inner shell segment being aligned concentrically with the outer shell segment with a compensation gap being formed between the inner shell segment and the outer shell segment substantially in a region below the plurality of openings; and
a plurality of strut holding fixtures, the strut holding fixtures having a hollow interior and a flange portion, wherein each of the strut holding fixtures is arranged in one of the plurality of openings and the flange portion extends within the compensation gap between the inner shell segment and the outer shell segment in each case wherein the outer shape of the outer shell segment and the inner shell segment is the shape of a cylinder.

2. The rotary joint according to claim 1, further comprising at least one end plate segment having an annular outer shape, the end plate segment being arranged at the lateral top or bottom area of the outer shell segment and the inner shell segment and providing a lateral boundary to the compensation gap.

3. The rotary joint according to claim 1, wherein the outer shell segment and the inner shell segment are connected to each other in regions between two adjacent ones of the plurality of openings.

4. A rotary joint, comprising:
an outer shell segment having the outer shape of a solid of revolution, the outer shell segment having a plurality of openings arranged in the outer surface;
an inner shell segment having the outer shape of the solid of revolution of the outer shell segment, the inner shell segment being aligned concentrically with the outer shell segment with a compensation gap being formed between the inner shell segment and the outer shell segment substantially in a region below the plurality of openings; and
a plurality of strut holding fixtures, the strut holding fixtures having a hollow interior and a flange portion,
wherein each of the strut holding fixtures is arranged in one of the plurality of openings and the flange portion extends within the compensation gap between the inner shell segment and the outer shell segment in each case,
wherein the outer shape of the outer shell segment and the inner shell segment is the shape of a spheroid.

5. A rotary joint, comprising:
an outer shell segment having the outer shape of a solid of revolution, the outer shell segment having a plurality of openings arranged in the outer surface;
an inner shell segment having the outer shape of the solid of revolution of the outer shell segment, the inner shell segment being aligned concentrically with the outer shell segment with a compensation gap being formed between the inner shell segment and the outer shell segment substantially in a region below the plurality of openings; and
a plurality of strut holding fixtures, the strut holding fixtures having a hollow interior and a flange portion,
wherein each of the strut holding fixtures is arranged in one of the plurality of openings and the flange portion extends within the compensation gap between the inner shell segment and the outer shell segment in each case,
wherein the outer shell segment, the inner shell segment and the plurality of strut holding fixtures are formed as an integral assembly by an additive layer manufacturing, ALM, technique.

6. A rotary joint, comprising:
an outer shell segment having the outer shape of a solid of revolution, the outer shell segment having a plurality of openings arranged in the outer surface;
an inner shell segment having the outer shape of the solid of revolution of the outer shell segment, the inner shell segment being aligned concentrically with the outer shell segment with a compensation gap being formed between the inner shell segment and the outer shell segment substantially in a region below the plurality of openings; and
a plurality of strut holding fixtures, the strut holding fixtures having a hollow interior and a flange portion,
wherein each of the strut holding fixtures is arranged in one of the plurality of openings and the flange portion extends within the compensation gap between the inner shell segment and the outer shell segment in each case,
wherein the diameter of the strut holding fixtures is lower than the diameter of the openings by a predefined clearance value.

7. The rotary joint according to claim 6, wherein the diameter of the flange portion is greater than the diameter of the openings.

8. A framework construction kit, comprising:
at least one rotary joint comprising
an outer shell segment having the outer shape of a solid of revolution, the outer shell segment having a plurality of openings arranged in the outer surface;
an inner shell segment having the outer shape of the solid of revolution of the outer shell segment, the inner shell segment being aligned concentrically with the outer shell segment with a compensation gap being formed between the inner shell segment and the outer shell segment substantially in a region below the plurality of openings; and
a plurality of strut holding fixtures, the strut holding fixtures having a hollow interior and a flange portion,
wherein each of the strut holding fixtures is arranged in one of the plurality of openings and the flange portion extends within the compensation gap between the inner shell segment and the outer shell segment in each case; and
a plurality of interconnection struts comprising engaging members at the respective end portions for insertion into the strut holding fixtures of the at least one rotary joint.

9. The framework construction kit according to claim 8, wherein the plurality of interconnection struts comprise a first female-threaded strut section having a hollow cylindrical profile with a female-threaded locking nut and a second strut section having a male-threaded end portion, the male-threaded end portion being engageable into the female thread of the locking nut and the female thread of the hollow cylindrical profile of the first female-threaded strut section.

10. The framework construction kit according to claim 8, wherein at least some of the plurality of interconnection struts comprise an actuator attached to the first strut section and configured to rotate the male-threaded end portion of the second strut section to selectively adjust an overall length of the respective interconnection strut.

11. A framework, comprising:
a plurality of rotary joints comprising
an outer shell segment having the outer shape of a solid of revolution, the outer shell segment having a plurality of openings arranged in the outer surface;
an inner shell segment having the outer shape of the solid of revolution of the outer shell segment, the inner shell segment being aligned concentrically with the outer shell segment with a compensation gap being formed between the inner shell segment and the outer shell segment substantially in a region below the plurality of openings; and
a plurality of strut holding fixtures, the strut holding fixtures having a hollow interior and a flange portion,
wherein each of the strut holding fixtures is arranged in one of the plurality of openings and the flange portion extends within the compensation gap between the inner shell segment and the outer shell segment in each case; and
a plurality of interconnection struts comprising engaging members at the respective end portions which are inserted into strut holding fixtures of the plurality of rotary joints.

12. The framework according to claim 11, wherein the framework takes on the shape of a frame having two substantially parallel beams formed by a first subset of the interconnection struts and diagonally staggered crossbeams between the two substantially parallel beams formed by a second subset of the interconnection struts.

13. The framework according to claim 11, wherein the framework includes two beams formed by a first subset of the interconnection struts, the two beams being interconnected by means of two end rotary joints at their respective end sections, and diagonally staggered crossbeams between the two beams formed by a second subset of the interconnection struts.

14. A method for constructing a framework, the method comprising:
- engaging a plurality of interconnection struts comprising engaging members at the respective end portions with respective strut holding fixtures of a plurality of rotary joints, each of the plurality of rotary joints comprising:
- an outer shell segment having the outer shape of a solid of revolution, the outer shell segment having a plurality of openings arranged in the outer surface;
- an inner shell segment having the outer shape of the solid of revolution of the outer shell segment, the inner shell segment being aligned concentrically with the outer shell segment with a compensation gap being formed between the inner shell segment and the outer shell segment substantially in a region below the plurality of openings; and
- a plurality of strut holding fixtures, the strut holding fixtures having a hollow interior and a flange portion, wherein each of the strut holding fixtures is arranged in one of the plurality of openings and the flange portion extends within the compensation gap between the inner shell segment and the outer shell segment in each case; and
- adjusting the length of the interconnection struts to form an outer profile of the framework formed by the interconnection struts and the rotary joints.

15. The method according to claim 14, wherein a first subset of the plurality of interconnection struts each comprise a first female-threaded strut section having a hollow cylindrical profile with a female-threaded locking nut and a second strut section having a male-threaded end portion, the male-threaded end portion engaged with the hollow cylindrical profile of the first strut section and the female thread of the locking nut, and
- wherein adjusting the length of the interconnection struts comprises adjusting the fraction of the male-threaded end portion that is inserted into the hollow cylindrical profile of the first strut section.

16. The method according to claim 14, wherein a second subset of the plurality of interconnection struts comprise an actuator attached to the first strut section and configured to rotate the male-threaded end portion of the second strut section to selectively adjust an overall length of the respective interconnection strut, and
- wherein adjusting the length of the interconnection struts comprises controlling the actuator to adjust the fraction of the male-threaded end portion that is inserted into the hollow cylindrical profile of the first strut section.

* * * * *